Oct. 26, 1926.
F. H. BULTMAN, JR
1,604,112
TRANSMISSION
Filed March 17, 1919
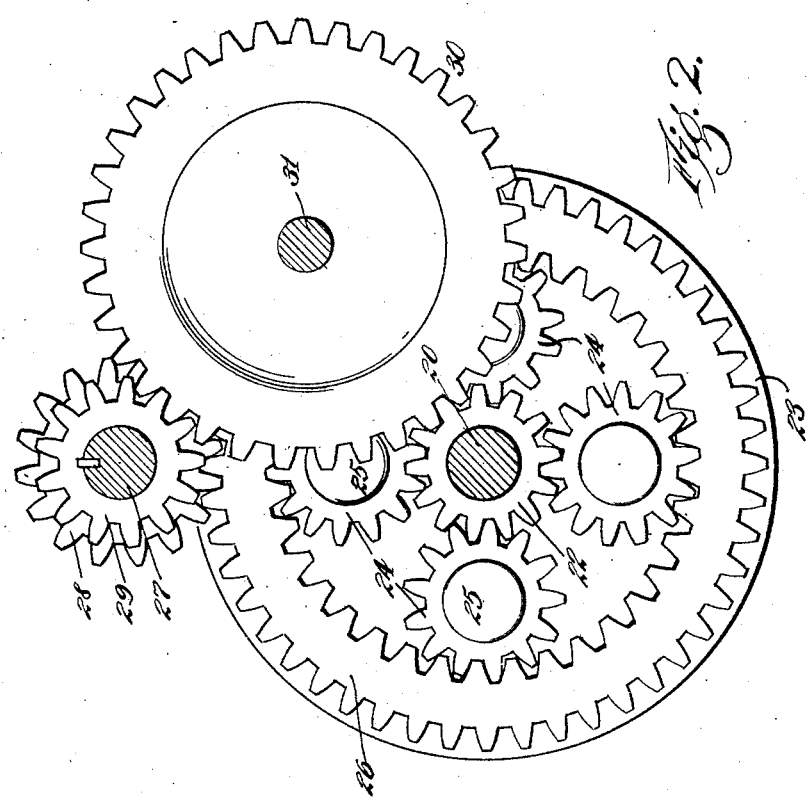
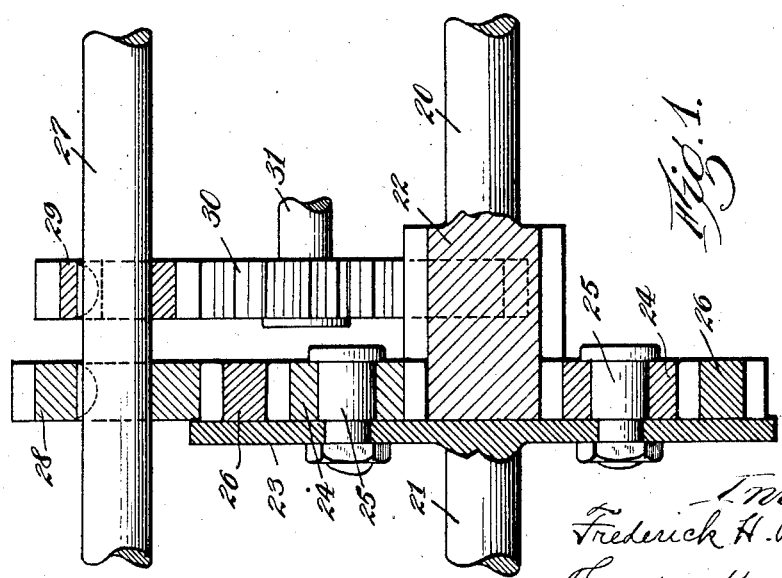
Inventor,
Frederick H. Bultman Jr.
By Thurston, Kwis & Hudson
Attys.

Patented Oct. 26, 1926.

1,604,112

UNITED STATES PATENT OFFICE.

FREDERICK H. BULTMAN, JR., OF CLEVELAND, OHIO.

TRANSMISSION.

Application filed March 17, 1919. Serial No. 283,061.

This invention relates to a power transmitting device which is particularly intended to provide a high ratio of reduction between a driving and a driven shaft.

The object of the invention is to provide a speed change mechanism in which the various elements may be compactly arranged thereby enabling them to be encompassed within a comparatively small space which it is not possible to accomplish by using gears in a manner which is at present known in the art so far as I am aware.

Generally speaking, the invention may be said to comprise the elements and the combinations thereof set forth in the accompanying claim.

Reference should be had to the accompanying drawings forming a part of this specification in which Fig. 1 is a sectional elevation of a mechanism embodying my invention.

Fig. 2 is a side elevation of the gear arrangement shown in Fig 1.

The principle which underlies the present invention is that of providing a spider which carries a gear or gears and subjecting this gear or gears to the simultaneous driving action from other gears which last mentioned gears are driven at such surface rates of speed with respect to their respective pitch lines, that there is produced a different speed which is imparted to the spider and causes the spider to rotate about its own axis.

The spider is attached or connected to a shaft. In the specification and the forms of the invention explained, the shaft connected to the spider is the driven shaft because in the following description I am explaining the gear arrangement, as a speed reducing device.

Referring to the drawing, 20 indicates a shaft which may be called the driving shaft, and 21 indicates what may be termed a driven shaft. This designation is correct where the purpose is to produce a speed reducing arrangement. Upon shaft 20 there is mounted or otherwise secured a gear 22.

Upon the shaft 21 and mounted to rotate therewith is a spider 23. Upon the spider there are mounted a plurality of gears 24, these gears being mounted upon studs 25 which are secured to the spider. Surrounding the gears 24 is a ring gear 26 having teeth upon its internal surface. The internal teeth of ring gear 26 mesh with the teeth of the gears 24.

Upon a counter shaft, 27 there is secured a gear 28, the teeth of which mesh with the external teeth upon ring gear 26. There is also a second gear 29 secured upon the counter shaft 27 and the teeth of gear 29 mesh with the teeth of a gear 30 which is mounted upon a shaft 31 which may conveniently be a stub shaft.

The gear 30 as shown in the drawing meshes with gear 22. Assuming that shaft 20 is the driving shaft and rotating in a clockwise direction, it then rotates gear 22 clockwise which in turn rotates the spider gears 24 in a counter-clockwise direction Also gear 22 rotates gear 30 counter-clockwise which in turn rotates gear 29 clockwise and gear 28 also rotates clockwise. Gear 28 rotates the ring gear 26 in a counter-clockwise direction and the gears 24 are rotating on their axes in the same direction and in mesh with the internal teeth of ring gear 26.

It will be evident that various numbers of teeth may be employed upon the various gears, for the purpose of forming various speed relationships between shafts 20 and 21. For instance, when gear 22 has 12 teeth, gear 30 any number of teeth, gear 29, 12 teeth, gear 28, 16 teeth, ring gear 26, 49 external teeth and 36 internal teeth, and the idler gears each 12 teeth, under such conditions the speed relationship between shafts 20 and 21 is as 120 to 1 or in other words, shaft 20 will make 120 revolutions while 21 makes 1 revolution.

The surface speed at the pitch line of gear 22 differs from the surface speed at the pitch line of the internal teeth of ring gear 26 and the spider with the gears 24 must move its axis because of this fact. When the surface speed at the pitch line of gear 22 is greater than the surface speed at the pitch line of the internal teeth of ring gear 26, the spider rotates about its axis in the same direction as gear 22 and vice versa.

Having described my invention, I claim:

A transmission device comprising a spider mounted for rotation about its own axis, a gear mounted on the spider, a ring gear having external and internal teeth, the internal teeth meshing with the gear on the spider, a shaft, a gear driven from said shaft and meshing with the gear on the spider, a countershaft, a gear on said countershaft meshing with the external teeth of the ring gear, a second gear on the countershaft and a gear connecting the gear on the countershaft with the gear on the shaft first mentioned.

In testimony whereof, I hereunto affix my signature.

FREDERICK H. BULTMAN, Jr.